(12) United States Patent  (10) Patent No.: US 9,039,420 B1
Alayoub  (45) Date of Patent: May 26, 2015

(54) TEAM-BUILDING EDUCATIONAL TRAINING SYSTEM

(71) Applicant: Ayoub Khaled Alayoub, Mishrif (KW)

(72) Inventor: Ayoub Khaled Alayoub, Mishrif (KW)

( * ) Notice: Subject to any disclaimer, the term of this patent is extended or adjusted under 35 U.S.C. 154(b) by 0 days.

(21) Appl. No.: 14/340,530

(22) Filed: Jul. 24, 2014

(51) Int. Cl.
  *G09B 19/00* (2006.01)
  *A47D 15/00* (2006.01)
  *A47G 9/06* (2006.01)

(52) U.S. Cl.
  CPC .............. *G09B 19/00* (2013.01); *A47D 15/003* (2013.01); *A47G 9/062* (2013.01)

(58) Field of Classification Search
  USPC ......................................................... 434/237
  See application file for complete search history.

(56) References Cited

U.S. PATENT DOCUMENTS

| | | | |
|---|---|---|---|
| 4,337,048 A | | 6/1982 | Hatch et al. |
| 4,690,045 A | * | 9/1987 | Badger ........................... 99/485 |
| 4,813,436 A | * | 3/1989 | Au ................................ 600/592 |
| 4,813,665 A | * | 3/1989 | Carr .................................. 482/3 |
| 5,163,686 A | | 11/1992 | Bergman |
| 5,848,830 A | * | 12/1998 | Castle et al. ..................... 362/84 |
| 5,971,761 A | * | 10/1999 | Tillman, Sr. ..................... 434/81 |
| 6,417,778 B2 | * | 7/2002 | Blum et al. ................. 340/815.4 |
| 6,421,858 B1 | * | 7/2002 | Cuerel ............................... 5/713 |
| 6,450,886 B1 | * | 9/2002 | Oishi et al. ....................... 463/36 |
| 6,669,486 B2 | | 12/2003 | Frankenbery et al. |
| 6,783,829 B2 | * | 8/2004 | Arena ........................... 428/40.1 |
| D552,909 S | * | 10/2007 | McGrath et al. ................ D6/582 |
| 2002/0028313 A1 | * | 3/2002 | Blum et al. ....................... 428/54 |
| 2003/0127800 A1 | * | 7/2003 | Kenney .......................... 273/292 |
| 2005/0073105 A1 | * | 4/2005 | Given ............................. 273/449 |
| 2006/0194651 A1 | * | 8/2006 | Hawk ............................. 473/414 |
| 2007/0105629 A1 | * | 5/2007 | Toyama ........................... 463/42 |
| 2007/0172802 A1 | | 7/2007 | Adams et al. |
| 2010/0159427 A1 | | 6/2010 | Bachar |
| 2012/0020586 A1 | * | 1/2012 | Gilbert .............................. 383/4 |
| 2014/0024284 A1 | * | 1/2014 | Keenan .......................... 446/227 |

OTHER PUBLICATIONS

Educational Experience. "*Bee-Bot Transparent Grid Mat plus Dreamworld Map*" Retrieved on May 21, 2014 (2 pages).
Tesco Direct, "*Galt Tummy Time Butterfly Baby Playmat and Amusing Caterpillar Toy*," Retrieved on May 21, 2014 (8 pages).

* cited by examiner

*Primary Examiner* — Robert J Utama
(74) *Attorney, Agent, or Firm* — Richard C Litman

(57) ABSTRACT

The team-building educational training system includes a mat and a plurality of reflective surfaces, such as mirrors. The mat has a top surface, a bottom surface, and a plurality of openings defined therein. The top and bottom surfaces each have a plurality of uniquely identifiable indicia displayed thereon. The reflective surfaces are placed on the floor or ground under the mat. The team cooperatively lifts and manipulates the mat to align the openings with the reflective surfaces so that at least one team member can view reflections of the indicia on the reflective surfaces. The team cooperatively interprets the indicia and completes a variety of planned exercises to learn skills for working as a team.

18 Claims, 9 Drawing Sheets

| | | |
|---|---|---|
| Objective(s): | - To gain a common shared set of communication experiences  *160*<br>- To discover underlying issues inhibiting clear communication.<br>- To experience new communication behaviors and skill sets.  *165* | |
| Result(s) desired: | - Increasing work productivity.  *170*<br>- Enhancing ability to discover & resolve issues.  *175*<br>- Improving communication effectiveness.  *180* | |
| Time: | - 1-2 hours  *190* | |
| Team involvement: | - Teams of 2,4, or 6 engage in conjointly holding and perceiving values and other characteristics by looking through mirrors and then assembling reflections into perceptions, interpretations, and then conclusions.  *200* | |
| Requirements: | Multi mirrored mat imprinted with values and other terms. | |

| | |
|---|---|
| Objective(s): | - To discover & overcome the challenges to collaboration. 210<br>- To learn how to overcome the natural tendency to compete. 225<br>- To enable & practice skill sets that will be employed across 200<br>  any teamwork environment.<br>                                                                     230 |
| Result(s) desired: | - Increasing team bonding & awareness. 235<br>- Enhancing ability to discover & resolve issues. 240<br>- Improving the effectiveness of any group activity. 245 |
| Time: | -1-2.5 hours 250 |
| Team involvement: | -Teams of 2,4, or 6 engage in conjointly holding and perceiving values 260<br>and other characteristics by looking through mirrors and then assembling<br>reflections into perceptions, interpretations, and then conclusions. |
| Requirements: | Multi mirrored mat imprinted with values and other terms. |

*Fig. 8*

TEAM-BUILDING EDUCATIONAL TRAINING SYSTEM

BACKGROUND OF THE INVENTION

1. Field of the Invention

The present invention relates to educational devices and methods for providing instruction and training in skills need to work as a member of a team, and more particularly to an interactive team-building educational training system.

2. Description of the Related Art

Team-building educational training systems are considered one of the most effective ways in which students and employees are taught to work together to achieve a common goal, as well as developing communication skills. Such systems typically can be used to introduce an unknown individual to a group of people, as well as to encourage people to work together to improve productivity. For example, through the use of such systems, people (typically those who work in the same company or organization) learn to communicate with one another to achieve a common goal, instead of working individually to achieve the same goal. Encouraging employees to work in an interdependent environment instead of a competitive, individualistic environment when dealing with the development of new products or services, for example, can not only increase a company's productivity, but can also lead to a happier work force and a more relaxing work environment.

Unfortunately, while these team-building systems focus on the collaborative aspect when encouraging team building, they do not help people to develop their skills of perception.

Thus, a team-building educational training system addressing the aforementioned problem is desired.

SUMMARY OF THE INVENTION

The team-building educational training system generally includes a mat having a plurality of openings defined therein, a top surface, and a bottom surface, each surface including uniquely identifiable indicia, the system further including a plurality of reflective surfaces positioned under the mat and arranged to reflect the uniquely identifiable indicia on the bottom surface of the mat. The reflective surfaces can be arranged randomly or can be arranged according to a pre-set pattern on the floor or ground under the bottom portion of the mat. The mat can include at least one light source to illuminate reflections of the uniquely identifiable indicia on the bottom surface of the mat. The uniquely identifiable indicia can be selected from the group consisting of colors, numbers, symbols, signs (such as zodiac signs), words, or any combination thereof.

The mat can be configured to be manipulated by a plurality of users to align an opening with a reflective surface in order to see reflections of the uniquely identifiable indicia imprinted on the bottom surface of the mat. Once a reflection of the uniquely identifiable indicia has been discovered, the mat is further manipulated to discover additional reflections of additional uniquely identifiable indicia imprinted on the bottom surface of the mat. After the users have discovered all of the uniquely identifiable indicia imprinted on the bottom surface of the mat necessary to complete a given objective, the users have completed a team-building educational exercise.

These and other features of the present invention will become readily apparent upon further review of the following specification and drawings.

BRIEF DESCRIPTION OF THE DRAWINGS

FIG. 7 is a top view of a set of sample instructions for an exercise using a team-building educational training system according to the present invention.

FIG. 8 is a top view of an alternative set of sample instructions for an exercise using a team-building educational training system according to the present invention.

Similar reference characters denote corresponding features consistently throughout the attached drawings.

DETAILED DESCRIPTION OF THE PREFERRED EMBODIMENTS

Figure 4:
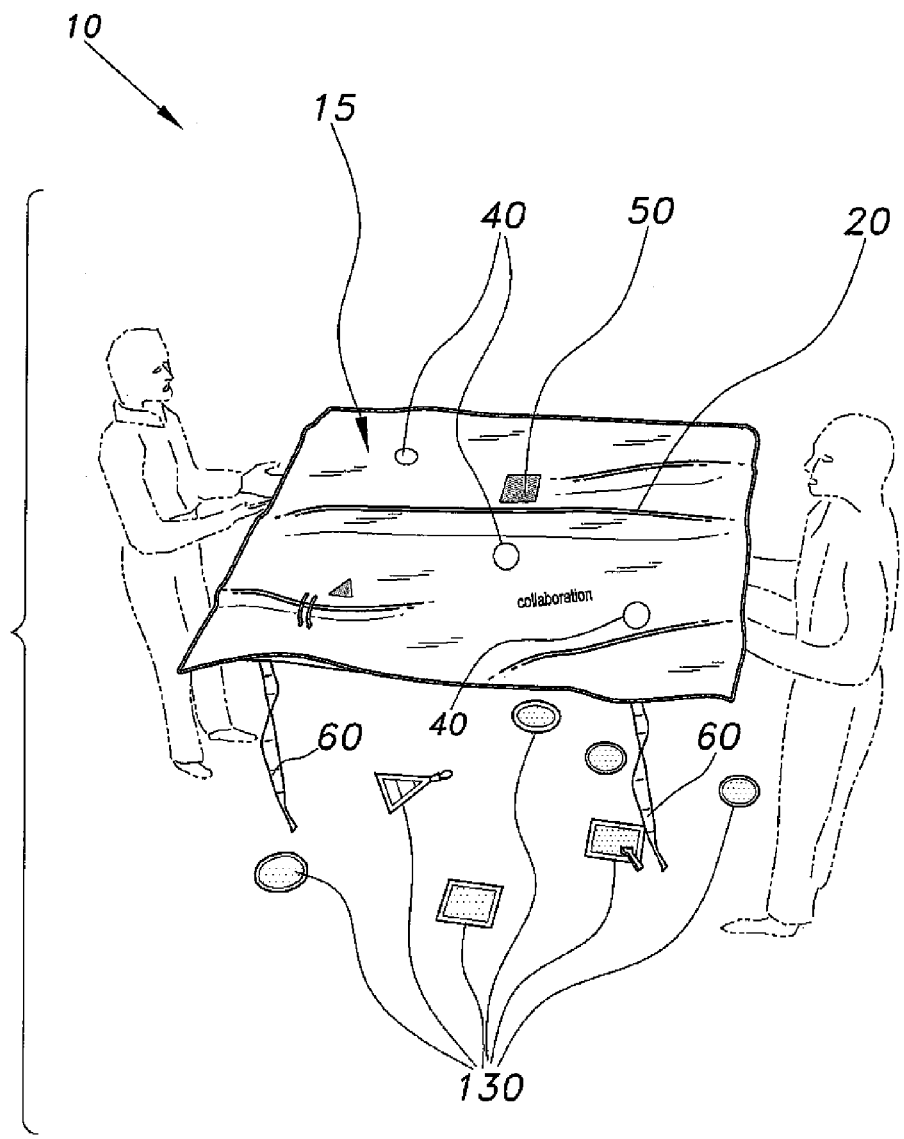
FIG. 4 is an environmental perspective view of participants utilizing the team building educational training system according to the present invention.
Figure 5:
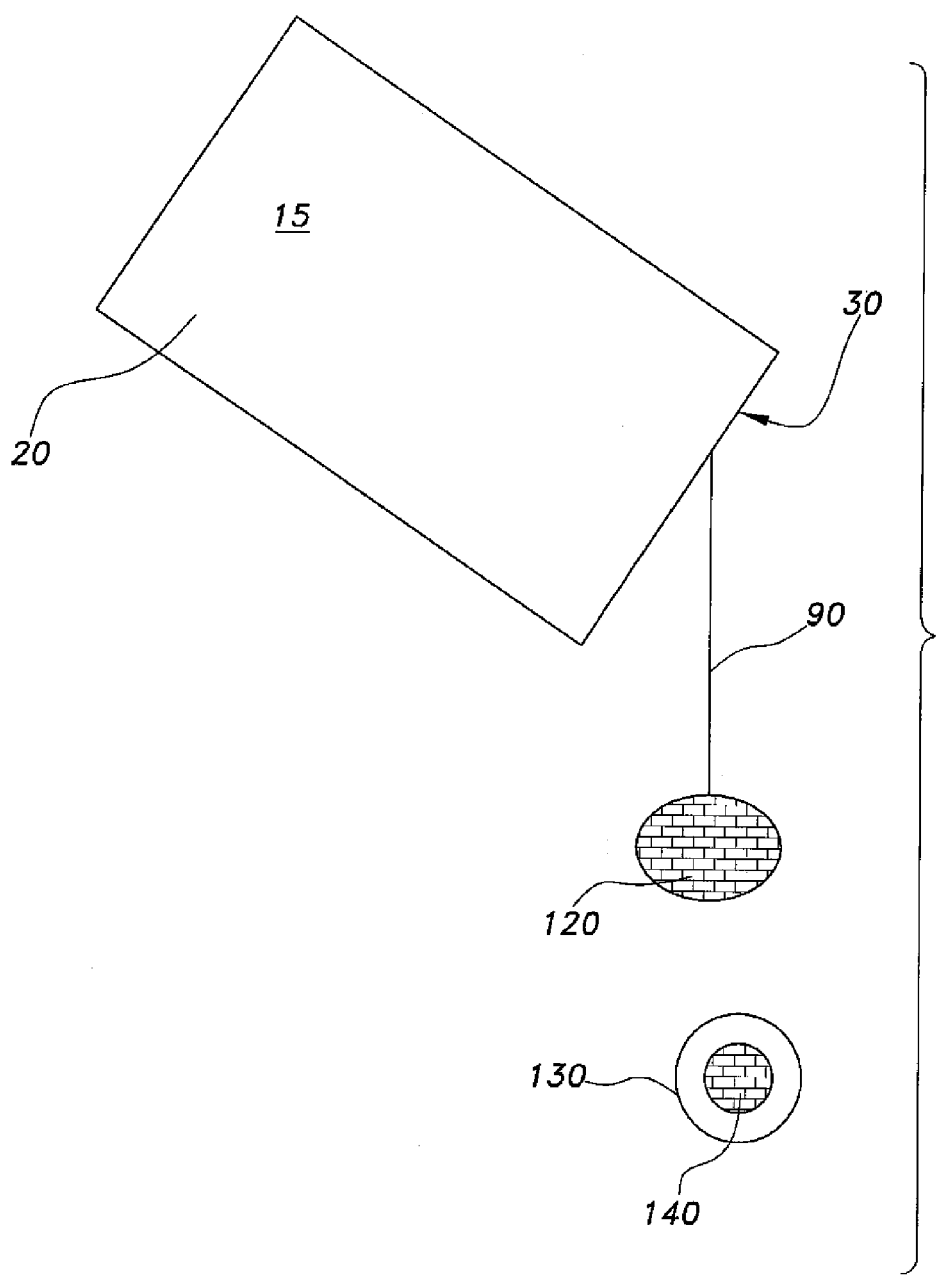
FIG. 5 is a schematic perspective view of the team building educational training system of FIG. 1, showing a ball suspended from the bottom surface of the mat being reflected by a mirror on the floor.
Figure 6:
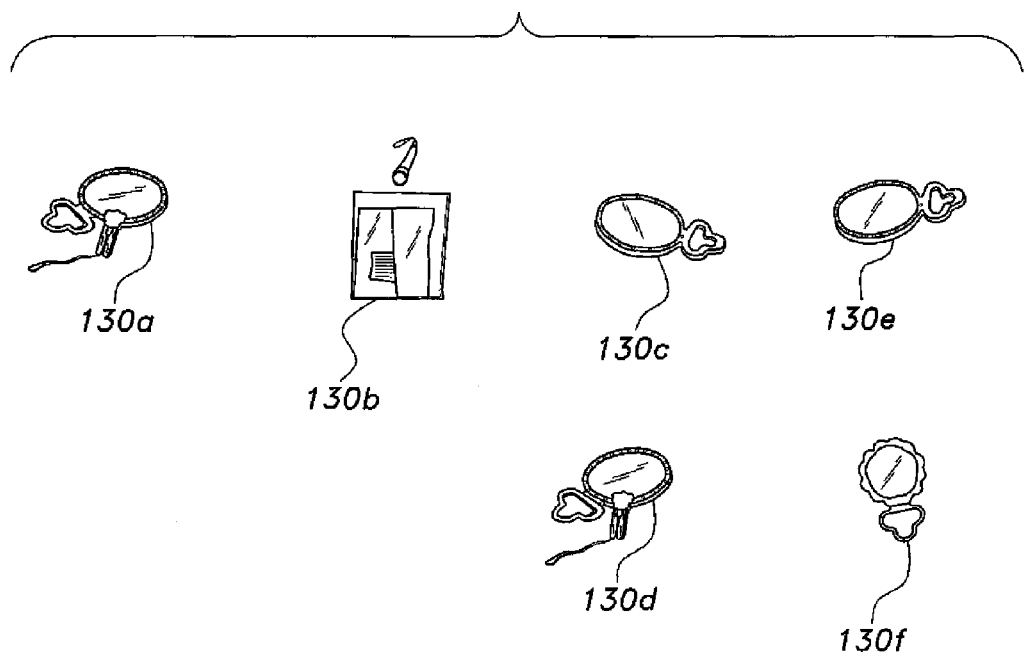
FIG. 6 is a perspective view of a kit of reflective surfaces in a team-building educational training system according to the present invention.

Referring to FIGS. 1-6, a team-building educational training system 10 generally includes a mat 15 having a plurality of openings 40 defined therein, a top surface 20, and a bottom surface 30 (shown in FIG. 3), each surface 20, 30 including uniquely identifiable indicia 35, the system 10 further including a plurality of reflective surfaces 130 (FIG. 4), such as mirrors, that are positioned in relation to the mat 15, such as on the floor or ground underneath the mat 15, and that are arranged to reflect the uniquely identifiable indicia 35 imprinted on the bottom surface 30 of the mat 15, wherein users manipulate the mat 15 to align at least one of the plurality of openings 40 with at least one of the plurality of reflective surfaces 130 to be able to see the reflection 140 of the uniquely identifiable indicia 35 imprinted on the bottom surface 30 of the mat 15. It is to be noted that the plurality of reflective surfaces 130 can include a variety of shapes and designs, such as reflective surfaces 130a, 130b, 130c 130d, 130e, and 130f, as illustrated in FIG. 6.

Figure 1:
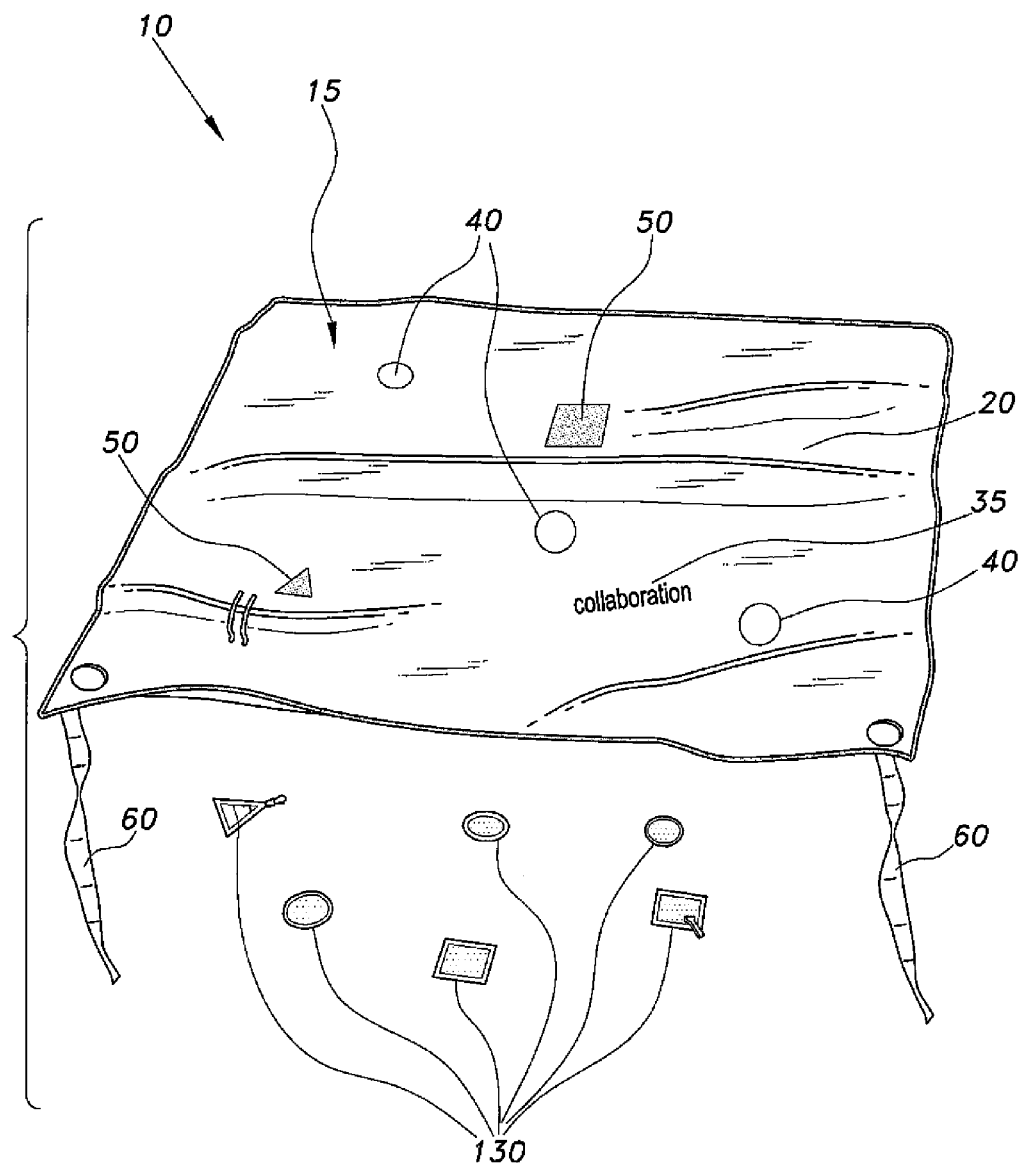
FIG. 1 is a perspective view of a team-building educational training system according to the present invention.
Figure 2:
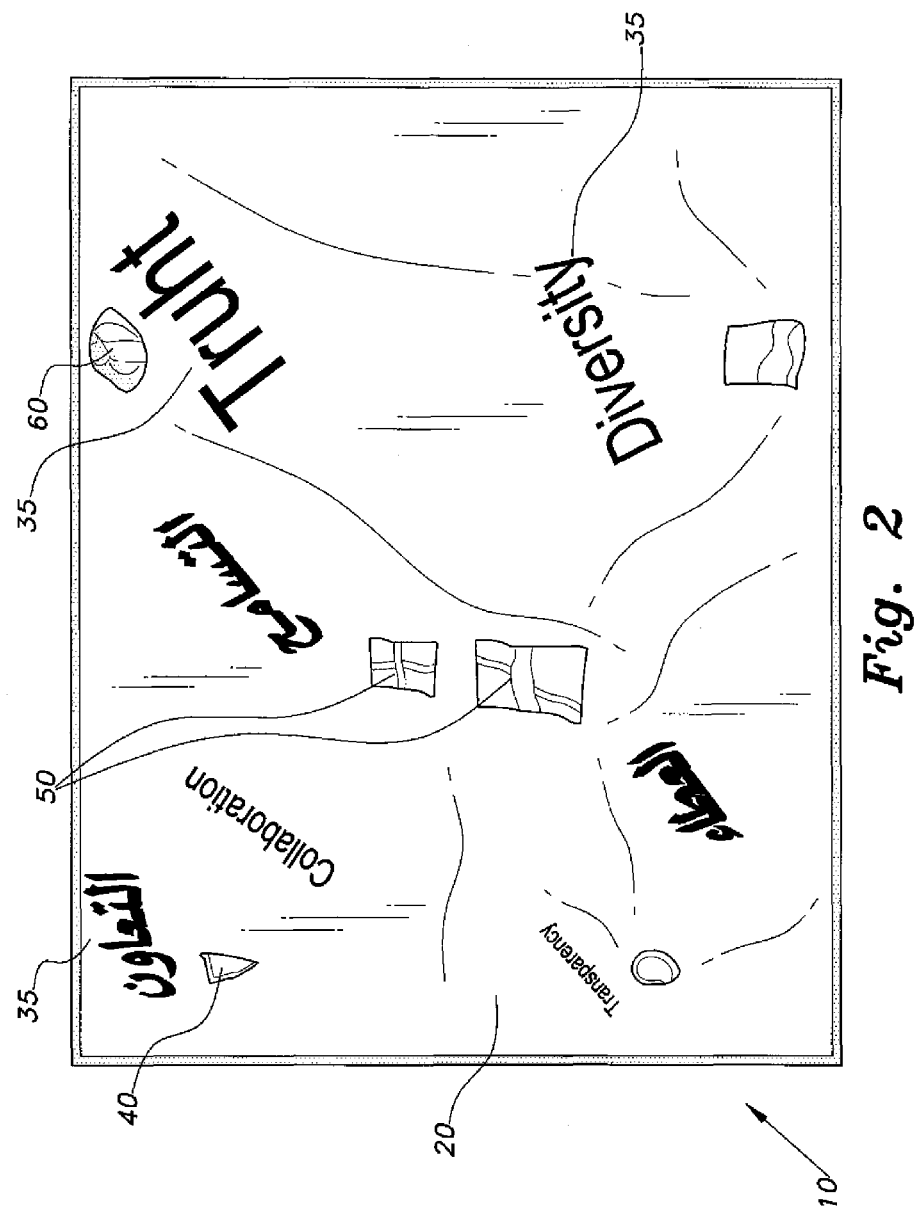
FIG. 2 is a top view of a mat in a team-building educational training system according to the present invention.
Figure 3:
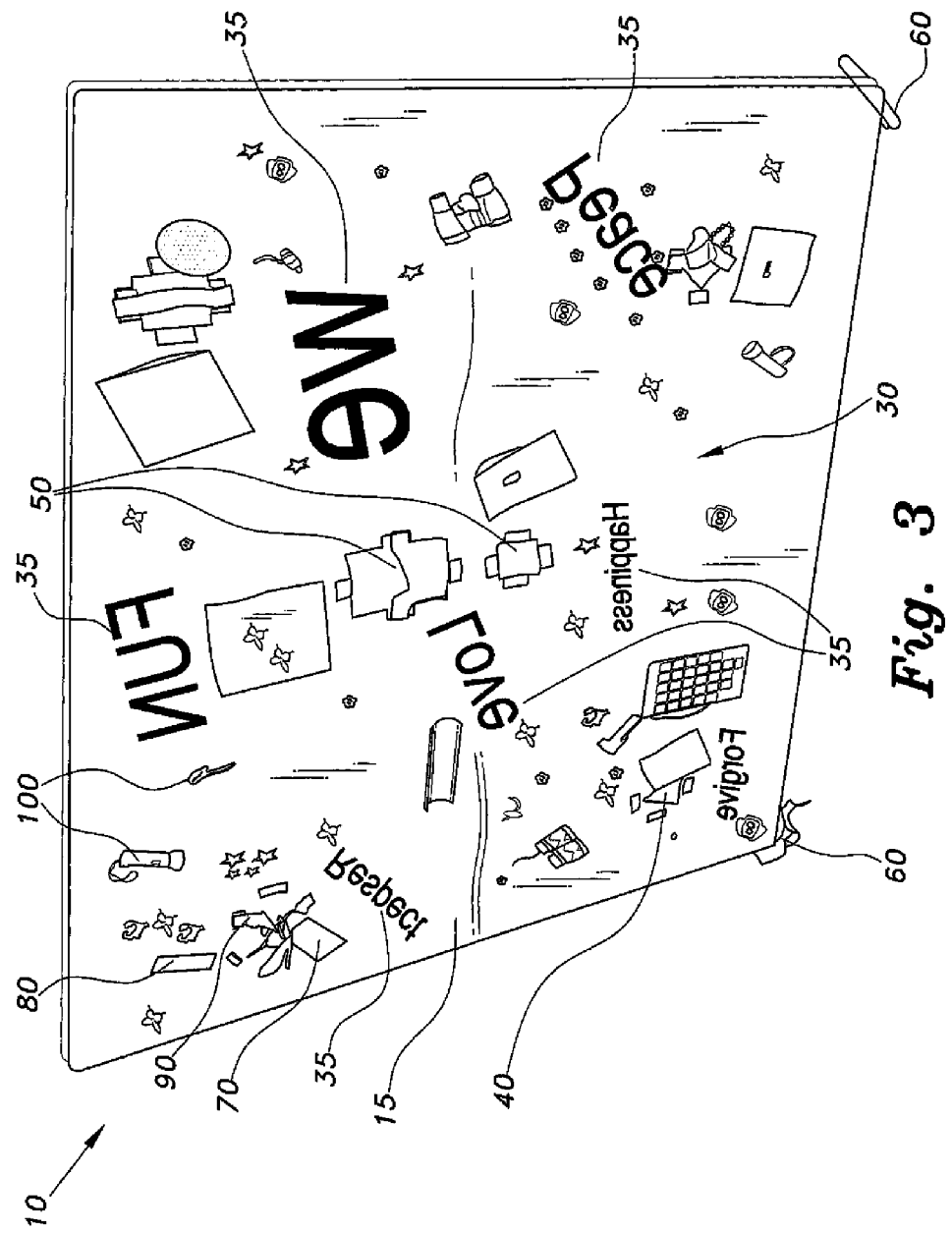
FIG. 3 is a perspective view showing the bottom surface of a mat according to the present invention.

Each of the plurality of openings 40 can include a corresponding cover 70 (shown in FIG. 3). The mat 15 can also be adapted to include at least one transparent section 50 or window (preferably a plurality of transparent sections 50) and at least one flexible member 60 (preferably a plurality of flexible members 60), such as a tether or strap, attached to the mat 15 so that users can manipulate the mat 15. The flexible material 60 can be positioned in the corners of the mat 15, as illustrated in FIG. 1, or can be positioned towards the center of the mat 15, as illustrated in FIG. 2. The flexible member(s) 60 can be formed from any suitable flexible material, such as plastic. The at least one opening 40 can be formed in various shapes, such as a circle, triangle, square, a zigzag, or a combination thereof.

The mat 15 may have a pocket 80 holding cards, such as playing cards, and at least one crescent-shaped flexible member 90 (preferably a plurality of crescent-shaped flexible members 90) for hanging objects 120 (such as balls, signs, and other objects) from the bottom surface 30 of the mat 15 when the mat 15 is elevated so that the reflection 140 can be shown by the plurality of reflective surfaces 130, as illustrated in FIG. 5. The mat 15 can further be configured to include at least one light source 100 (preferably a plurality of light sources 100), such as a flashlight or a glow stick, which can be configured to illuminate the uniquely identifiable indicia 35 on the bottom surface 30 of the mat 15. The light source 100, such as a flashlight, can be adapted to include a power source, such a battery, to illuminate the uniquely identifiable indicia 35 on the bottom surface 30 of the mat 15.

It is to be understood that the mat 15 can be of any suitable size, such as eight feet wide and nine feet long. Further, the corners of the mat 15 can be of various shapes, such as square corners or corners of a generally square shape, as illustrated in FIGS. 1-4. The mat 15 can be formed of any suitable material, such as plastic, rubber, natural or synthetic fibers, a nonwoven polymer mat or film sheet, or other flexible material.

The uniquely identifiable indicia 35 on the mat 15 can include educational puzzles, such as a word search puzzle in which a set of two words is hidden within a variety of other words and the object of the game is to discover the set of two words. The uniquely identifiable indicia 35 can also include misspelled words, illustrations, anagrams, ciphers, crossword puzzles, as well as different colors, different numbers, different symbols, different signs (such as zodiac signs), different words, or any combination thereof. It is to be noted that the words can be presented backwards, or can be distorted. Additionally, the font of the uniquely identifiable indicia 35 on the mat 15 can be of one or more different types, of one or more different styles, of one or more different sizes, or a combination thereof.

By way of operation, a group of individuals can be divided into separate teams, typically including two, four, or six people. Before using the system 10, the plurality of reflective surfaces 130 can be positioned in relation to the mat 15, such as on the floor or ground underneath the bottom surface 30 of the mat 15. The plurality of reflective surfaces 130 can be arranged on a floor with the plurality of reflective surfaces 130 facing upward, as illustrated in FIGS. 1 and 4. It must be noted that the plurality of reflective surfaces 130 can be randomly arranged, or can be arranged in a pre-set pattern beneath the bottom portion 30 of the mat 15. The participants on each team can then take hold of the mat 15 by either taking grasping the mat 15 directly, or by taking hold of the at least one flexible member 60 attached to the mat 15. Once the participants have control of the mat 15 or the flexible member(s) 60, the mat 15 can be lifted from the floor and held above of the plurality of reflective surfaces 130 so that the plurality of reflective surfaces 130 can reflect the uniquely identifiable indicia 35 on the bottom surface 30 of the mat 15, as illustrated in FIG. 4.

Continuing with reference to FIG. 4, once the participants have lifted the mat 15 and are holding the mat 15 above the plurality of reflective surfaces 130 the mat 15 can be manipulated so that the participants can look through the opening(s) 40 or through the transparent section(s) 50 to view the image of the uniquely identifiable indicia 35 being reflected on the plurality of reflective surfaces 130, as illustrated by the reflection 140 in FIG. 5. For example, the participants can communicate with one another to lift the mat 15 upwards, lower the mat 15 downwards, or even twist the mat 15 so that at least one team member can look though the opening(s) 40 or through the transparent section(s) 50 to see the reflection 140 of the uniquely identifiable indicia on at least one of the plurality of reflective surfaces 130.

As illustrated in FIG. 7, an example of an exercise 150 incorporating the system 10 includes as its objectives to gain a common shared set of communication experiences 155, to discover underlying issues inhibiting clear communication 160, and to experience new communication behaviors and skill sets 165. As such, the desired results include increasing work productivity 170, enhancing ability to discover and resolve issues 175, and improving communication effectiveness 180. To complete this exercise 150, the participants need approximately between one to two hours 190. The participants can be separated into teams of two, four, or six participants engaged in conjointly holding and perceiving the uniquely identifiable indicia 35 and other characteristics by holding the mat 15 above the plurality of reflective surfaces 130 and then working together to manipulate the mat 15 in order to be able to see reflections of the uniquely identifiable indicia 35 on the bottom surface 30 of the mat 15 to assemble perceptions, interpretations, and conclusions 200.

As illustrated in FIG. 8, an alternative exercise 210 of an application incorporating the system 10 includes as its objectives to discover and overcome the challenges to collaboration 200, to learn how to overcome the natural tendency to compete 225, and to enable and practice skill sets that will be employed across any teamwork environment 230. As such the desired results include increasing team bonding and awareness 235, enhancing ability to discover and resolve issues 240, and improving the effectiveness of any group activity 245. To complete this alternative exercise 210, the participants need approximately between one to two and one-half hours 250. The participants can be separated into teams of two, four, or six participants engaged in conjointly holding and perceiving the uniquely identifiable indicia 35 and other characteristics by holding the mat 15 above the plurality of reflective surfaces 130 and then working together to manipulate the mat 15 in order to be able to see the uniquely identifiable indicia 35 on the bottom surface 30 of the mat 15 to assemble perceptions, interpretations, and conclusions 260.

Figure 9:
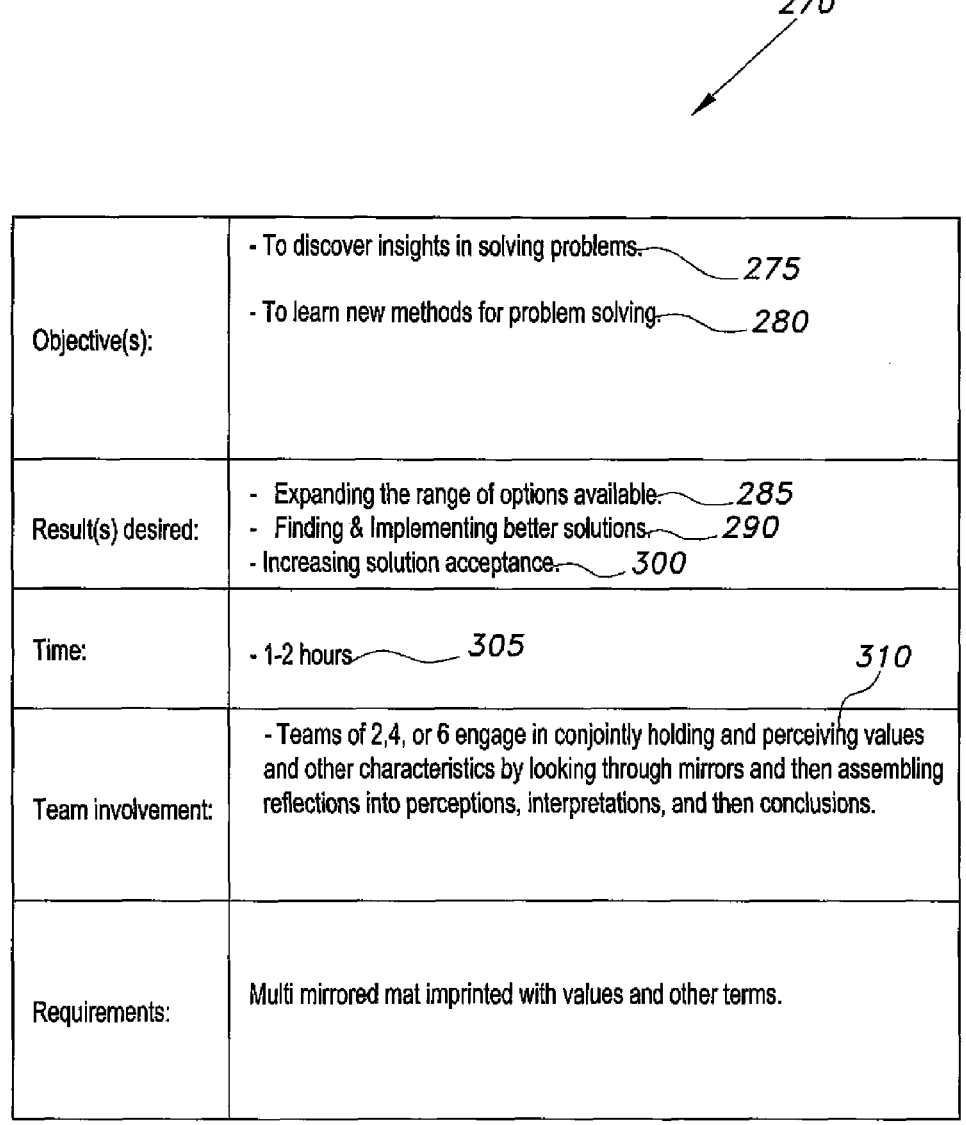
FIG. 9 is a top view of another alternative set of sample instructions for an exercise using a team-building educational training system according to the present invention.

As illustrated in FIG. 9, an alternative exercise 270 of an application incorporating the system 10 includes as its objectives to discover insights into solving problems 275 and to learn new methods for problem solving 280. As such, the desired results include expanding the range of options available 285, finding and implementing better solutions 290, and increasing solution acceptance 295. To complete this alternative exercise 270, the participants need approximately between one to two hours 305. The participants can be separated into teams of two, four, or six participants engaged in conjointly holding and perceiving the uniquely identifiable indicia 35 and other characteristics by holding the mat 15 above the plurality of reflective surfaces 130 and then working together to manipulate the mat 15 in order to be able to see the uniquely identifiable indicia 35 on the bottom surface 30 of the mat 15 to assemble perceptions, interpretations, and conclusions 310.

The system 10 is not limited to exercises described above. The system 10 can also be used to develop brainstorming analysis among co-workers. For example, if a uniquely identifiable indicia 35 imprinted on the bottom portion 30 of the mat 15 is unclear, the participants can discuss different ways to correct the situation, including cleaning the plurality of reflective surfaces 130, changing the plurality of reflective surfaces 130, lowering the mat 15 closer to the plurality of reflective surfaces 130, or utilizing visualization aides, such as eyeglasses. The system 10 can also be utilized to develop and/or improve the ability to analyze. For example, an application can encourage the participants to describe the various uniquely identifiable indicia 35 appearing on the top portion 20 and the bottom portion 30 of the mat 15, as well as encouraged to describe the correlation between the uniquely identifiable indicia 35 seen on the plurality of reflective surfaces 130 and the uniquely identifiable indicia 35 seen on the top portion 20 of the mat 15. The number of participants can vary, as well as the number and the shape of the plurality of reflective surfaces 130, such as mirrors, the length and number of tethers 60, as well as the tasks to be completed.

It is to be understood that the present invention is not limited to the embodiments described above, but encompasses any and all embodiments within the scope of the following claims.

I claim:

1. A team-building educational training system, comprising:
    a mat having a plurality of openings defined, a top surface, and a bottom surface, each of the surfaces including uniquely identifiable indicia displayed thereon;
    means for grasping the mat, the means for grasping being designed and configured to be held by one of more hands; and
    a plurality of reflective surfaces positioned below the mat and arranged to reflect the uniquely identifiable indicia imprinted on the bottom surface of the mat;
    wherein users manipulate the mat by the means for grasping to align at least one of the openings with at least one of the reflective surfaces in order to see a reflection of the uniquely identifiable indicia displayed on the bottom surface of the mat.

2. The team-building educational training system according to claim 1, further comprising at least one light source disposed on the bottom surface of said mat, the at least one light source being configured to illuminate reflections of the uniquely identifiable indicia displayed on the bottom surface of the mat when the reflections of the indicia are visible on the reflective surfaces.

3. The team-building educational training system according to claim 1, wherein the uniquely identifiable indicia comprises at least one indicium selected from the group of indicia consisting of words, colors, numbers, shapes, and symbols.

4. The team-building educational training system according claim 1, wherein the uniquely identifiable indicia comprises at least one indicium selected from the group of indicia consisting of misspelled words, illustrations, anagrams, ciphers, and crossword puzzles.

5. The team-building educational training system according to claim 1, wherein the plurality of openings have a shape selected from the group consisting of squares, circles, ovals, rectangles, triangles, trapezoids, octagons, hexagons, and pentagons.

6. The team-building educational training system according to claim 1, wherein the plurality of reflective surfaces comprises a plurality of mirrors.

7. The team-building educational training system according to claim 1, wherein the at least one light source comprises a light source selected from the group consisting of flashlights and glowsticks.

8. A team-building educational training system, comprising:
    a mat having a top surface, a bottom surface, and a plurality of windows defined therein, each of the surfaces including uniquely identifiable indicia displayed thereon;
    means for grasping the mat, the means for grasping being designed and configured to be held by one of more hands;
    a plurality of reflective surfaces disposed on a supporting surface under the mat and arranged to reflect the uniquely identifiable indicia displayed on the bottom surface of the mat when the mat is raised above the supporting surface; and
    at least one light source attached to the bottom surface of the mat and configured to illuminate reflections of the uniquely identifiable indicia when the reflections are visible on the reflective surfaces;
    wherein a team of users may cooperatively manipulate the mat by the means for grasping to align at least one of the plurality of windows with at least one of the plurality of reflective surfaces so that at least one team member is able to see reflections of the uniquely identifiable indicia on the reflective surfaces.

9. The team-building educational training system according to claim 8, wherein the uniquely identifiable indicia comprises at least one indicium selected from the group consisting of words, colors, numbers, shapes, and symbols.

10. The team-building educational training system according claim 8, wherein the uniquely identifiable indicia comprises at least one indicium selected from the group consisting of misspelled words, illustrations, anagrams, ciphers, and crossword puzzles.

11. The team-building educational training system according to claim 8, wherein said windows comprise at least one opening defined in said mat.

12. The team-building educational training system according to claim 11, wherein said at least one opening has a shape selected from the group consisting of square, circular, oval, rectangular, triangular, trapezoidal, octagonal, hexagonal, and pentagonal.

13. The team-building educational training system according to claim 11, wherein said window further comprises a sheet of transparent material extending across the opening.

14. The team-building educational training system according to claim 8, wherein the plurality of reflective surfaces comprises a plurality of mirrors.

15. The team-building educational training system according to claim 8, wherein the at least one light source is a light source selected from the group consisting of flashlights and glowsticks.

16. The team-building educational training system according to claim 8, further comprising a crescent-shaped flexible member attached to the bottom surface of said mat adapted for suspending an object above said reflective surfaces when said mat is raised.

17. The team-building educational training system according to claim 8, further comprising a plurality of straps extending from the mat, the straps being adapted for gripping by team members to raise and manipulate the mat.

18. An educational method for building a team, comprising the steps of:
    providing a mat having a plurality of openings, a top surface, and a bottom surface, each of the surfaces including uniquely identifiable indicia displayed thereon;
    providing a plurality of graspable members attached to the mat;
    placing a plurality of reflective surfaces on a supporting surface under the mat, the reflective surfaces being configured to reflect the uniquely identifiable indicia when the mat is raised above the supporting surface;
    selecting an exercise;
    collaborating among the participants to achieve a common goal;
    lifting and manipulating the mat by the graspable members above the supporting surface as a team;
    positioning the lifted mat so that each of the participants is capable of viewing at least one of the plurality of openings; and looking through the plurality of openings in the mat while the mat is being lifted and manipulated in order to view a reflection of the uniquely identifiable indicia on the reflective surfaces;

whereby the participants are capable of interpreting the reflection; and whereby the participants are capable of drawing a conclusion collectively based on the reflection.

\* \* \* \* \*